(12) United States Patent
Savoor

(10) Patent No.: US 8,160,598 B2
(45) Date of Patent: Apr. 17, 2012

(54) LIGHTWEIGHT APPLICATION LEVEL POLICY MANAGEMENT FOR PORTABLE WIRELESS DEVICES UNDER VARYING NETWORK

(75) Inventor: Raghvendra Savoor, Walnut Creek, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 673 days.

(21) Appl. No.: 12/332,230

(22) Filed: Dec. 10, 2008

(65) Prior Publication Data

US 2010/0144332 A1 Jun. 10, 2010

(51) Int. Cl.
*H04W 88/02* (2009.01)
(52) U.S. Cl. .................................................. 455/450
(58) Field of Classification Search .............. 455/500, 455/552.1; 709/203, 212, 226, 232; 370/230, 370/329
See application file for complete search history.

(56) References Cited

U.S. PATENT DOCUMENTS

| 7,796,521 | B2* | 9/2010 | van Willigenburg | 370/236 |
|---|---|---|---|---|
| 2002/0078341 | A1* | 6/2002 | Genty et al. | 713/151 |
| 2003/0033421 | A1* | 2/2003 | Haeri et al. | 709/232 |
| 2006/0002319 | A1* | 1/2006 | Lee et al. | 370/310.1 |
| 2009/0180430 | A1* | 7/2009 | Fadell | 370/329 |
| 2011/0058036 | A1* | 3/2011 | Metzger et al. | 348/143 |

* cited by examiner

*Primary Examiner* — Diane Mizrahi
(74) *Attorney, Agent, or Firm* — Moazzam & Associates, LLC

(57) ABSTRACT

Devices and methods are disclosed which relate to dynamically adapting network policy on a wireless communications device to account for changes in network environment. These network policies are enforced, at least in part, at the device level, as opposed to solely at the network edges. The network policy is broad so as to encompass changes in network environment, such as increases and decreases in available bandwidth and presence or absence of security.

24 Claims, 4 Drawing Sheets

LIGHTWEIGHT APPLICATION LEVEL POLICY MANAGEMENT FOR PORTABLE WIRELESS DEVICES UNDER VARYING NETWORK

BACKGROUND OF THE INVENTION

1. Field of the Invention

The present invention relates to the field of policy management for networks. In particular, the present invention relates to dynamic policy-setting based on changing network conditions.

2. Background of the Invention

Wireless communications devices, such as cellular phones, have become tremendously popular. It is estimated that there were 3.3 billion cellular phone subscriptions at the end of 2007. Close to 80% of the world now enjoys cellular coverage, a figure only increasing as new networks appear. Along with the abundance of cellular phones comes the demand for new and improved services. It is no longer enough to just place and receive calls, users want it all.

Cellular phones today often are equipped to handle many types of services and applications. Users can now accomplish many tasks that they previously were forced to do from their home or office, including check their e-mail, surf the internet, and so forth. WIFI capabilities allow users to connect to the internet where wireless access is available. Users have now become very dependent upon these services and feel the need for access all throughout the day. Many individuals no longer have land lines in their homes, instead relying on cellular service. With the fast speed of business, businesses feel the need to have constant contact with their employees, regardless of their location. Calls and e-mails can be sent from most anywhere, allowing even the traveling businessman to stay on top of his work. However, these services may be limited to certain geographical areas, either by their network coverage or available networks in the area, and may be limited by their signal strength.

New networks increase the number of areas with available service. As many newer phones are equipped for WIFI access, WIFI hotspots allow for these phones to connect to the internet. Ad hoc networks such as these WIFI hotspots are appearing with more and more frequency as businesses and even individuals allow for secure and unsecured use. With the emergence of BLUETOOTH, areas with access to BLUETOOTH are also becoming increasingly common. Additionally, the increasing prevalence of femtocells increases areas of network availability. Femtocells, or Access Point Base Stations, connect to service providers' networks via broadband and allow service providers to extend service indoors, especially in areas of limited access. In the future, 4G networks will become prevalent as well. These networks will be the next complete evolution in wireless communications.

Dual or multi-mode devices, however, represent a particular challenge to current policy management methods. The proliferation of wireless devices with varying applications (data, voice, video, short message service, pagers, music download, gaming etc.) all competing for bandwidth connections to the wireless network creates a dynamic problem especially if no priorities are established for each service/application type under varying network conditions. All applications will attempt to hog the available bandwidth concurrently by autonomous connections to their respective servers for notifications, updates and communication transactions. These applications may cause e-mail to send and receive slower, texts to not appear, slow web browsing, and so on. Static policy management is currently available for networks. With this type of management, a master user of a network can set bandwidth limits for applications and other users that use the network. Note that this policy is 'static' in the sense that once network policy is set by the user, this policy is applied regardless of the current conditions of the network. However, static methods of policy management would not be optimal for a portable wireless device with various network modes that could roam into sectors of varying bandwidth. Many of these new phones are multi-mode and have various network interfaces such as EDGE, GPRS, wCDMA, WiFi, WiMAX, etc. These new phones benefit from a more flexible scheme of policy management versus, for example, a scheme whereby a certain application was always restricted to a certain small portion of the available bandwidth. Policy management for wireless devices is currently just a best effort. All services compete with each other for equal priority. A user of the device, however, may not view the services equally. The dynamic methods of policy management known in the art are not suited to portable devices where changing bandwidth conditions must be monitored at the level of the device itself and not only at fixed network policy enforcement points.

Additionally, network security may be an important factor in network policy decisions. Identity theft has become a common tactic for criminals these days, and one of the largest sources of identity theft is through the internet. To avoid vulnerability, if the user is connected to an unsecured network, the user may wish not to use certain applications which may contain personal information.

What is needed is a way to allow a user to select priority for applications on the user's mobile device which adjust based upon available bandwidth and the security of the network.

SUMMARY OF THE INVENTION

The present invention is a method and system for dynamically adapting network policy on a wireless communications device to account for changes in network environment. These network policies are enforced, at least in part, at the device level, as opposed to solely at the network edges. The network policy is broad so as to encompass changes in network environment, such as increases and decreases in available bandwidth and presence or absence of security.

Furthermore, the present invention can be used with existing network systems. It allows a user to choose which programs and applications enjoy priority to the network connection. A user may want to give priority to streaming video or real-time games when the network connection yields a high bandwidth. When the network yields a lower bandwidth, the user may want to give priority to voice calls and e-mail to ensure the functioning of core necessities.

In one embodiment, the present invention is a wireless communications device for dynamically adapting network policy, comprising a housing, a memory within the housing, a processor within the housing, an RF transmitter within the housing receiving a variable bandwidth, at least one program located on the memory, a plurality of preferences located on the memory, and a preferences logic located on the memory which controls usage of the variable bandwidth by the program. The plurality of preferences defines which programs have network priority based on an instant availability of the variable bandwidth.

In another exemplary embodiment, the present invention is a wireless communications system for dynamically adapting network policy, comprising a wireless communications device including a network policy, a wireless transceiver in communication with the wireless communications device, a network in communication with the wireless transceiver, a server in communication with the network, and a database of preferences updated by the server. The wireless communications device updates the database with the network policy through the server, and the server sends the wireless communications device the network policy upon an event.

In yet another exemplary embodiment, the present invention is a method of establishing and administering a network policy on a wireless communications device, comprising creating a network policy comprising a plurality of queues, storing the network policy, and allocating a portion of bandwidth based on the plurality of queues. Each queue represents a priority level where queues with a higher priority receive larger portions of bandwidth than queues with a lower priority.

DETAILED DESCRIPTION OF THE INVENTION

The present invention is a method and system for dynamically adapting network policy on a wireless communications device to account for changes in network environment. These network policies are enforced, at least in part, at the device level, as opposed to solely at the network edges. The network policy is broad so as to encompass changes in network environment, such as increases and decreases in available bandwidth and presence or absence of security.

DEFINITIONS

"Wireless communications device", as used in this disclosure, refers to any device capable of wireless communication. Wireless communications devices include cellular telephones, personal digital assistants (PDAs), laptop computers, etc.

"Network Policy", as used in this disclosure, refers to a set of guidelines dictating how programs and services are prioritized in order to maximize the effectiveness of a given bandwidth. Network policy is not mutually exclusive from quality of service (QoS).

In an exemplary embodiment, the mobile device is provisioned with a local policy manager which supports data queues to the network connection. This manager establishes rules and priorities for each application on the device dynamically under varying network conditions, such as bandwidth availability or network security. Creating these rules and application priorities allows the network to maintain a high quality of service for applications, even under circumstances such as network congestion. Network policies establish which applications are allowed to connect to the network under certain conditions; which applications get priority in connecting to the network under certain conditions; and which applications are guaranteed certain levels of quality of service under certain conditions.

Additionally, in a further embodiment, the present invention provides for a remote policy manager (RPM) that manages subscribers' policies on a global basis and keeps an inventory of the policies for all wireless devices capable of utilizing these policies. The RPM keeps track of subscriber device type, logical and physical attributes (e.g., BLACKBERRY PEARL has more memory than a SAMSUNG BLACKJACK etc.), service subscriptions (video broadcast subscriptions, etc.) and a set of default contention rules under varying network conditions. In this embodiment, the RPM administers the subscribers' local policies as they sign up for new services, roam into new sectors, or when they buy a new device. In this manner, both users and service providers can easily and transparently manage users' subscriptions and their demands on the networks those subscriptions use.

Figure 1:
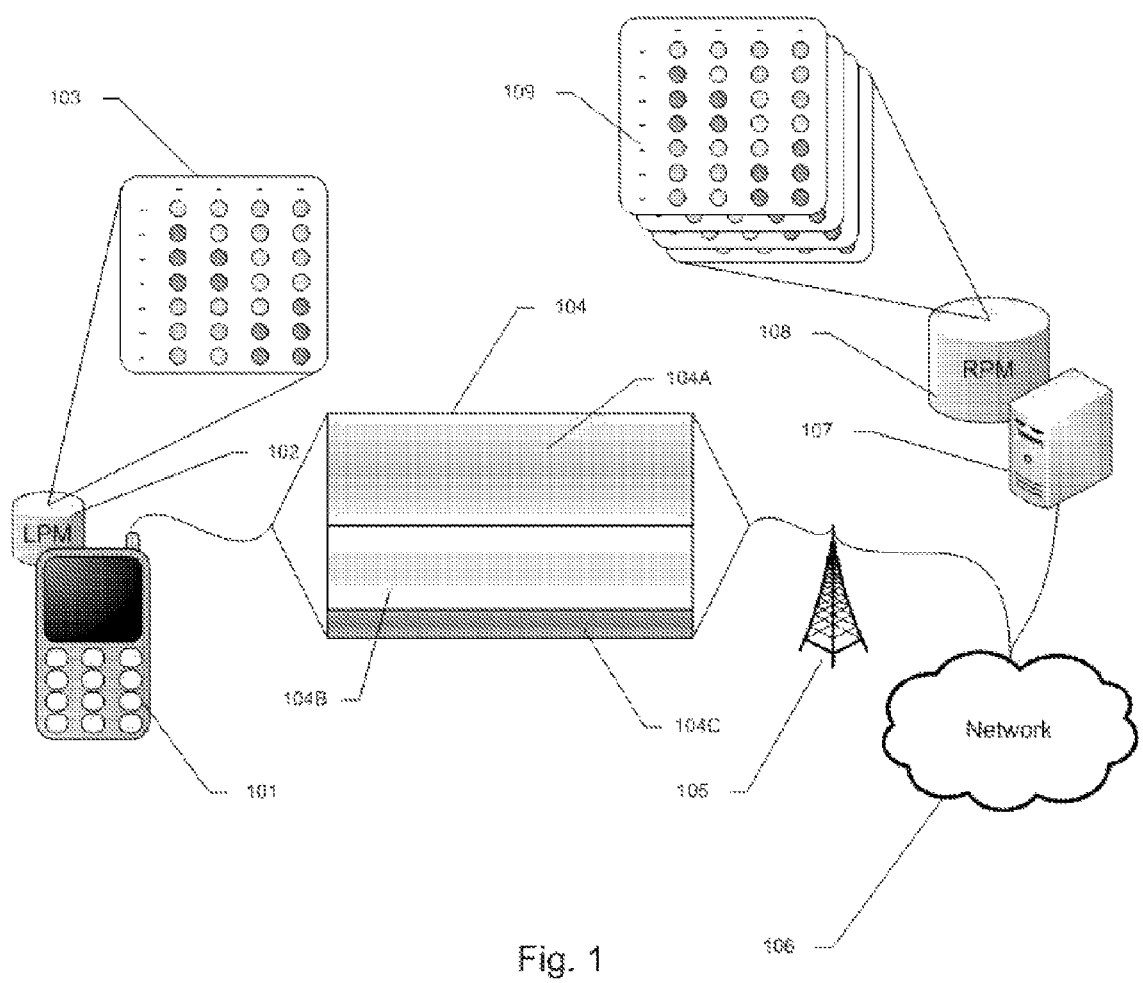
FIG. 1 shows a system featuring local and remote policy management, according to an exemplary embodiment of the present invention.

FIG. 1 shows a system featuring local and remote policy management, according to an exemplary embodiment of the present invention. In this embodiment, the system comprises a wireless communications device 101, a local policy manager 102, local preferences 103, a cellular tower 105, an available bandwidth 104, a remote policy manager 107/108, remote preferences 109, and a network 106. Wireless communications device 101 is a device capable of communicating with network 106. In this embodiment, the communication is accomplished by sending a signal through cellular tower 105. Local policy manager 102 is contained onboard wireless communications device 101. Local policy manager 102 is responsible for placing running applications on wireless communications device 101 into queues based upon local preferences 103 and available bandwidth 104. Local preferences 103 are set by the user and determine which applications have priority to available bandwidth 104 under various network conditions. For instance, when available bandwidth 104 is limited, the user may want e-mail to have the highest priority such that it sends and receives. However, when available bandwidth 104 is high, e-mail sends and receives even in the lowest priority. The user may wish applications such as video to run at a faster speed, and should elect video to have a high priority. Local preferences 103 are stored within the memory of wireless communications device 101. Available bandwidth 104 is further divided into gold 104A, silver 104B, and bronze 104C categories. Each of these comprises a portion of available bandwidth 104 that is used by each of the levels of application priority. The user may set how much of available bandwidth 104 is allocated to each of these levels under various network conditions. For instance, if the available bandwidth 104 is 3 Mbps, the user may select to have 1.5 Mbps allocated to gold 104A, 1 Mbps allocated to silver 104B, and 0.5 Mbps allocated to bronze 104C. This means that the applications which are categorized as gold 104A when 3 Mbps of bandwidth is available share 1.5 Mbps of the bandwidth 104, the silver 104B applications share 1 Mbps, and bronze 104C applications share 0.5 Mbps. In alternative embodiments, there are more than the three levels in order to determine more specific priority for the applications. Remote policy manager 107/108 comprises a server 107 and database 108 in communication with network. Remote policy manager 107/108 stores the local preferences 109 of each user as well as their device type, subscription, etc. in database 108. This allows users to keep their preferences when switching wireless communication devices, fixing corrupted preferences, reverting to a previous version of preferences, etc. Server 107 portion of remote policy manager 107/108 frequently updates database 108 when users change their preferences so that it remains current. Database of remote policy manager 108 is updated mainly by wireless communications device 101 itself, but can also be updated without the use of wireless communications device 101. A user may visit a website to change preferences 109 and update them to database of remote policy manager 108 without interacting with wireless communications device 101. If database of remote policy manager 108 is updated in this manner, it requires preferences 109 to be downloaded to wireless communications device 101 before they are effective.

Figure 2:
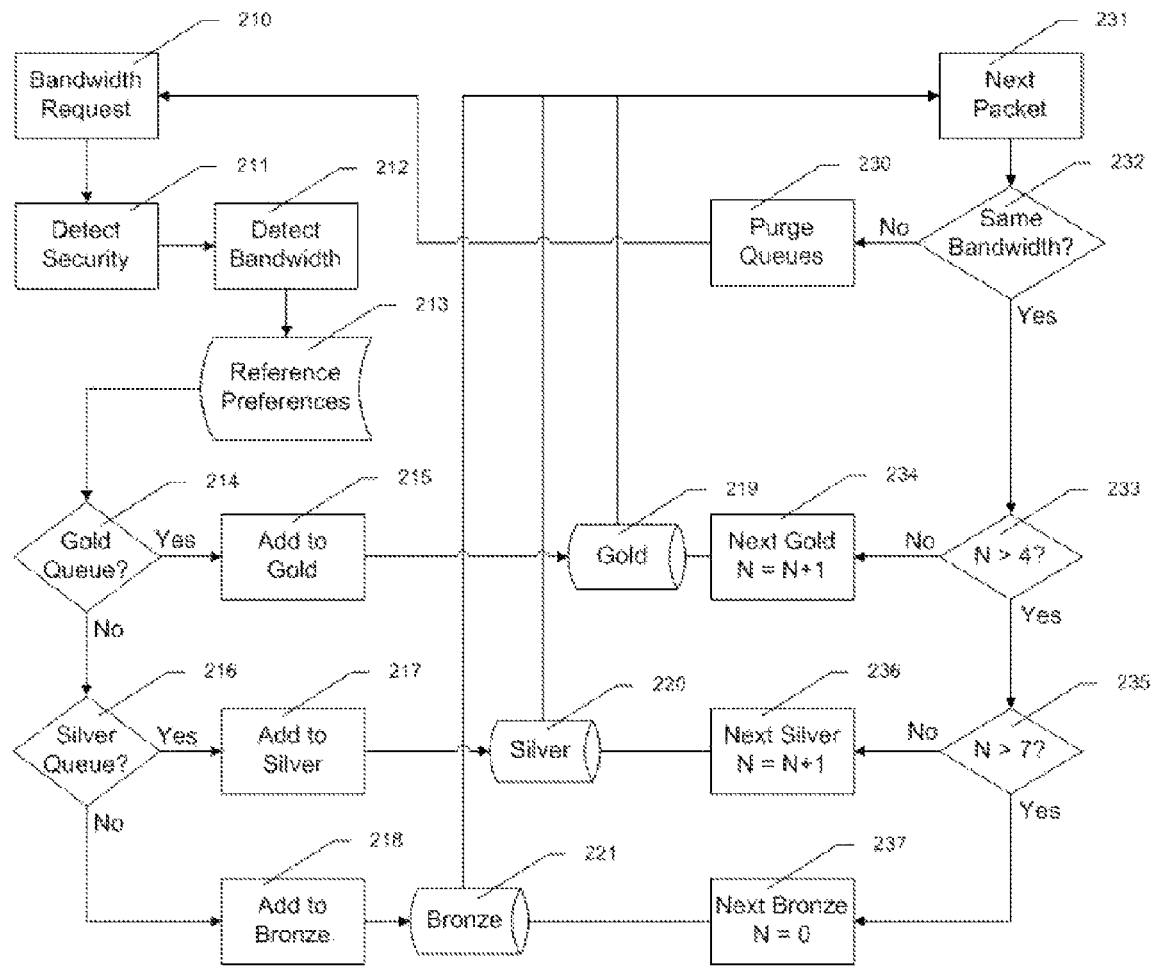
FIG. 2 shows a flowchart of a method of local policy management, according to an exemplary embodiment of the present invention.

FIG. 2 shows a flowchart of a method of local policy management, according to an exemplary embodiment of the present invention. In this embodiment, a bandwidth request 210 begins the process. Bandwidth requests 210 occur whenever an application requests data from a network such as the INTERNET. This may occur when an application is opened on a wireless communications device, when the wireless communications device is turned on, when the wireless communications device detects a new network, when it detects a change in signal, etc. After bandwidth request 210 begins the process, the wireless communications device detects an available network's security 211. This security determines which applications are allowed to run, as the user may wish to use certain applications only under secure conditions. The wireless communications device also detects the amount of bandwidth 212 available to the device. With the security and bandwidth detected, local policy manager references the user's preferences 213 to determine the desired action under the conditions. The local policy manager references the preferences 213 to determine if the application requesting bandwidth is set to be in the gold queue 214. If the user has set the preference as in the gold queue, the application is placed in this queue 215. If the user has not set the preference for the gold queue, the local policy manager determines if the application should be put in the silver queue 216. If it should be placed in the silver queue under the network conditions, it is 217. If not, the local policy manager adds the application to the bronze queue 218. Applications in the gold queue 219 are allowed access to the bandwidth allocated to the gold queue 219. Similarly, applications in the silver 220 and bronze queues 221 are allowed to access the bandwidth allocated to these respective queues.

Once the applications have been divided into queues, the queues must be executed. In this exemplary embodiment the execution starts when the wireless communications device is ready to send the next packet of information 231. First, the wireless communications device checks for a change in bandwidth 232 since the last packet was sent. If the bandwidth has changed, then the queues must be purged 230, and each application must go through the queue selection process again based on preferences associated with the new bandwidth. If the bandwidth is the same, however, the wireless communications device must select from the gold, silver, and bronze queues. The wireless communications device keeps track of a number, N, to measure how often it selects from each queue. At first, N is set to zero and the next application from the gold queue is selected to send its packet 234. During this selection N increases by one 234. The wireless communications device selects from the gold three more times until the value of N exceeds four 233. At this point the wireless communications device selects from the silver queue 236 until N is greater than seven 235. The next packet is selected from the bronze queue 237 and N is reset back to zero 237. In this exemplary embodiment the wireless communications device selects from the gold queue 219 half the time, the silver queue 220 three-eighths of the time, and the bronze queue 221 one-eighth of the time. Other embodiments assign different frequencies to the gold, silver, and bronze queues. Further embodiments of the present invention encompass other queuing methods readily recognizable to one skilled in the art.

Figures 3A, 3B:
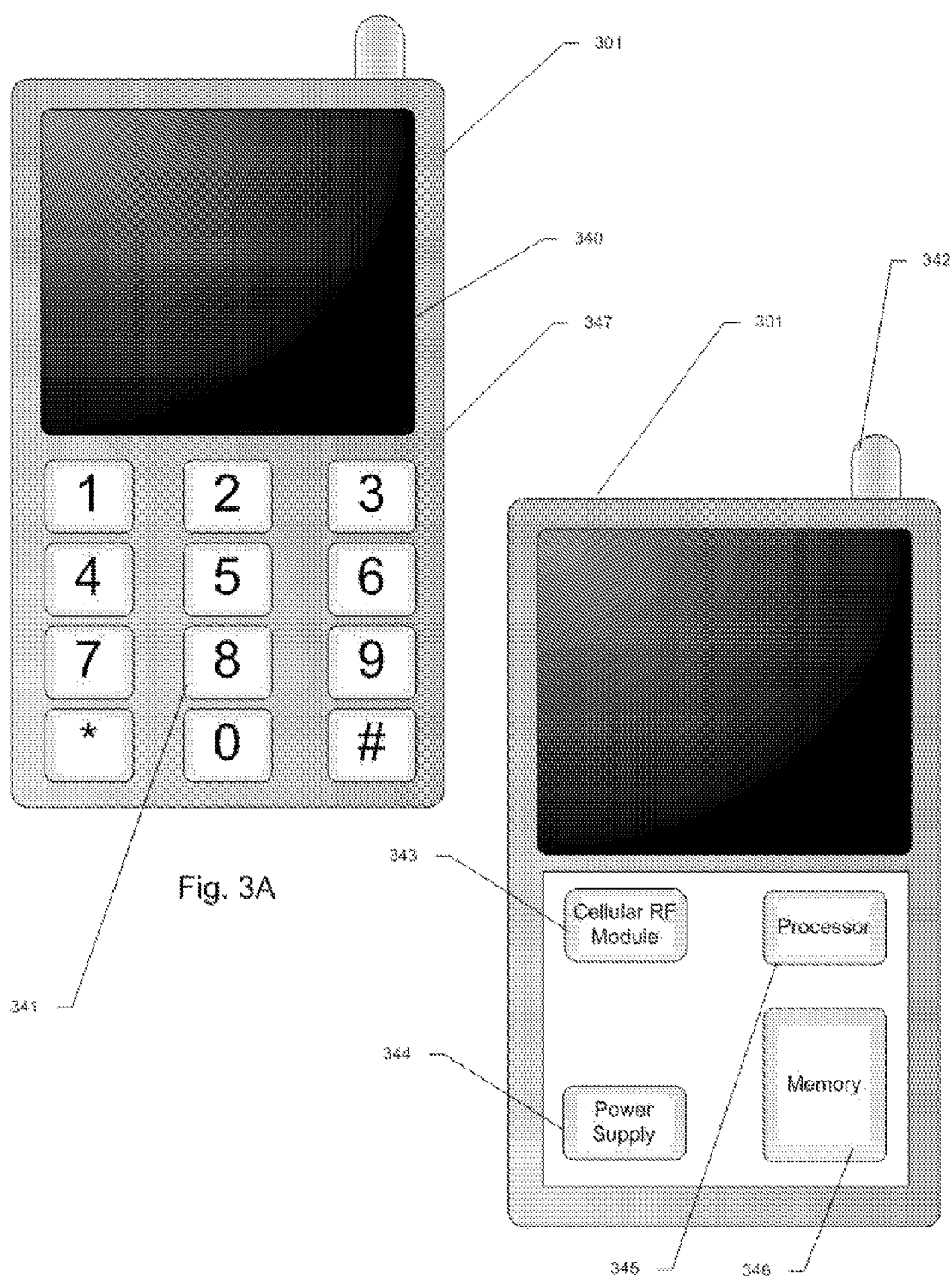
FIGS. 3A and 3B show a wireless communications device that holds a local policy manager, according to an exemplary embodiment of the present invention.

FIGS. 3A and 3B show a wireless communications device 301 that holds a local policy manager, according to an exemplary embodiment of the present invention. Wireless communications device 301 comprises a memory 346, a cellular RF module 343, a processor 345, a power source 344, an antenna 342, a screen 340, a keypad 341, and a housing 347. In this embodiment, the local policy manager is a software program contained in wireless communications device's memory 346. The local policy manager detects which applications are running and places them in a queue based upon the priority given to the application by the user. When enough bandwidth is available, all of the applications may run. However, in the event of limited bandwidth, the applications at the top of the queue are allowed access to the bandwidth first or are given a certain percentage of available bandwidth. Embodiments of the present invention provide for multiple queues for different ranges of bandwidth. These multiple queues allow the user to decide which applications need more bandwidth under different ranges of conditions. Memory 346 is a form of flash memory which stores data on wireless communications device 301. This data includes various applications which are executed by processor 345. Cellular RF module 343 transforms output signals from wireless communications device 301 into a radio frequency-modulated signal that communicates with the network through cellular towers. Cellular RF module 343 also transforms incoming radio frequency-modulated signals into input signals usable by wireless communications device 301. Antenna 342 sends and receives these RF signals between the cellular towers and wireless communications device 301. In further embodiments, antenna 342 also sends and receives WIFI signals, BLUETOOTH signals, etc. Power supply 344 provides power to each of wireless communications device 301's components. Display 340 provides an output device for the visual presentation of applications, telephone calls, etc. Keypad 341 provides an input mechanism. Among uses for keypad 341 is to program user preferences into the local policy manager. Housing 347 provides a protective covering for wireless communications device 301.

Other embodiments of the wireless communications device include a separate module containing the local policy manager. In these embodiments the local policy manager resides on its own dedicated memory. The local policy manager module may use its own processor or the processor of the wireless communications device.

Different users have different priorities for the applications on their wireless communications device. A businessman may need e-mails to be sent and received frequently and thus would want an e-mail application to have first priority to available bandwidth. Another user may use a variety of applications at once, but wants his web browsing to be fast. This user would want web browsing at the highest priority, with other applications garnering less bandwidth. These user preferences can be set at any time. The user may select them from a service provider when purchasing the wireless communications device, a website on the user's home computer, or even the wireless communications device itself.

Figure 4:
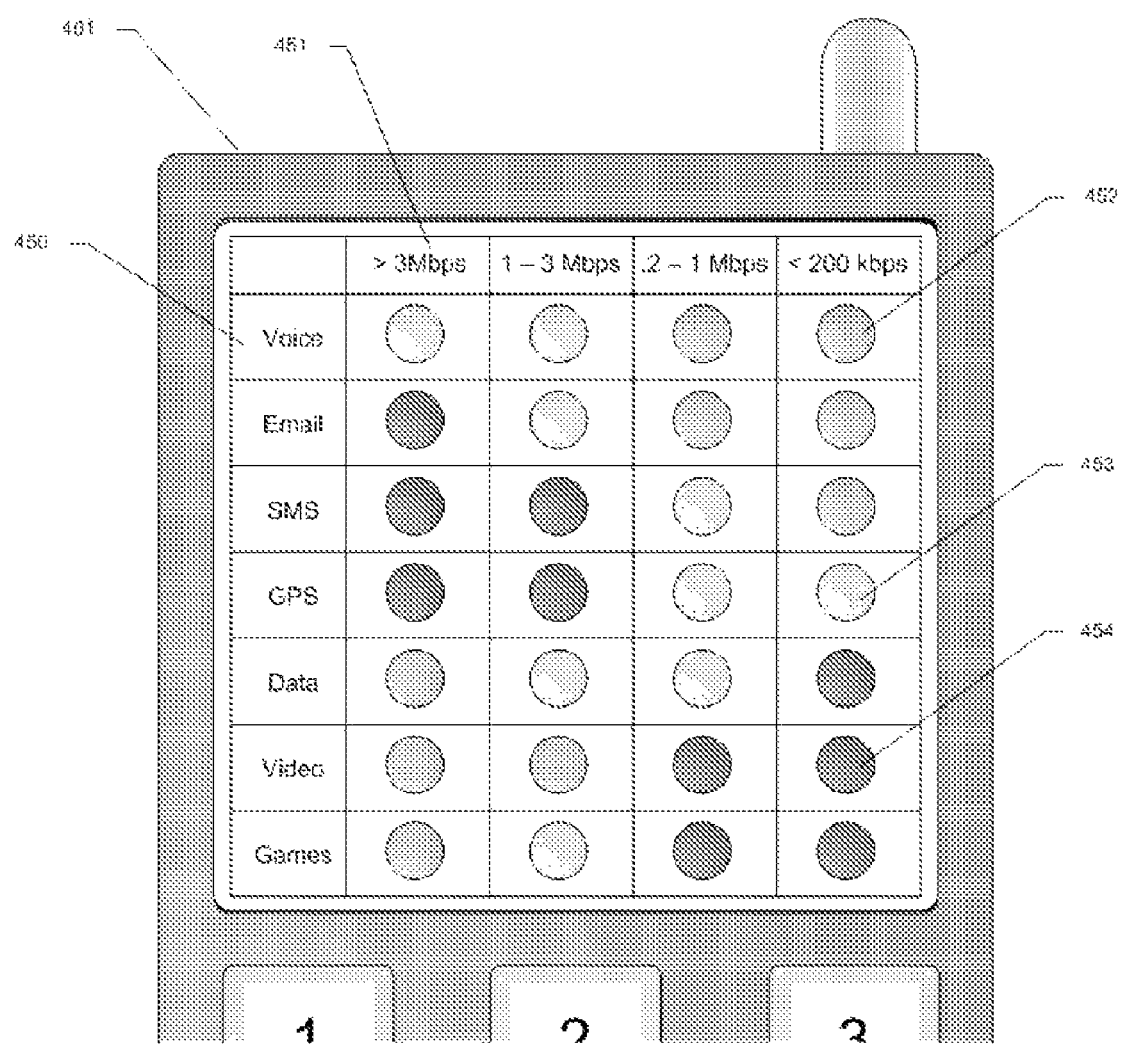
FIG. 4 shows a selection screen of user priorities, according to an exemplary embodiment of the present invention.

FIG. 4 shows a selection screen of user priorities, according to an exemplary embodiment of the present invention. In this embodiment, the user may select from three different priorities for an applications 450 in use. These priorities are gold 452 for the applications with the highest priority, silver 453 for the applications with the next level of priority, and bronze 454 for applications of the lowest priority. These priorities may be set for different ranges of available bandwidth 451. For instance, as shown in the figure, when the bandwidth is 3 Mbps the user selects video as gold priority, voice as silver priority, and GPS as bronze priority. Thus, when the available bandwidth is in this range, video gets the highest priority and will function over the bandwidth before other applications. This is to ensure that video streams at a high quality without pauses or breaks. Applications such as e-mail and SMS text messaging do not use much bandwidth. Therefore they can receive a low priority and still respond quickly. This is the queue scheme of the left-most column, the column of the greatest bandwidth. Columns to the right show queue schemes for lower available bandwidth. In the right-most column there is a drastic change in which applications receive gold priority and which applications receive bronze priority. This is because at low bandwidths applications like video are not going to come through clearly no matter how high of a priority it receives. At the same time, small applications like e-mail and SMS text messaging are now struggling to respond. The solution is to give applications like e-mail and SMS text messaging a high priority so that at least those processes can function adequately. Applications like video receive the lower priority because the user is just not worried about receiving video when a high bandwidth is not available.

Further embodiments can extend the priority settings to more than three levels. Embodiments of the present invention may also limit the number of applications under each type of priority. This prevents the user from selecting all gold priority, allowing applications to hog available bandwidth and cause congestion. Other embodiments allow a user to turn certain applications off completely when no priority is desired instead of simply a low priority. Further embodiments also allow the user to select the amount of bandwidth to be used for each of the different levels of priority. For instance, the user may select for the gold priority to be allowed 100 kbps of bandwidth before any of the other lower priority applications are allowed any bandwidth. If available bandwidth exceeds this, the silver priority is allowed access to an amount of set bandwidth. If the available bandwidth exceeds both the amount allocated to the gold and silver priorities, the bronze priority applications are allowed bandwidth as well. Many other variations of these preferences will be readily recognizable to one skilled in the art and are also within the scope of this invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A wireless communications device for dynamically adapting network policy in response to an event, the wireless communications device comprising:
   a housing;
   a memory within the housing;
   a processor within the housing;
   a radio frequency transmitter within the housing receiving a variable bandwidth;
   at least one program located on the memory;
   a plurality of preferences located on the memory; and
   a preferences logic located on the memory which controls usage of the variable bandwidth by the program;
   wherein the plurality of preferences defines which programs have network priority based on an instant availability of the variable bandwidth, and
   wherein the event is one of a purchase of a new wireless communications device, a determination of a corrupt network policy, and a command to revert to an old network policy.

2. The device in claim 1, wherein the plurality of preferences comprises a plurality of queues.

3. The device in claim 2, wherein the plurality of queues are associated with a priority.

4. The device in claim 3, wherein queues with a higher priority receive a larger portion of bandwidth than queues with a lower priority.

5. The device in claim 1, wherein the preferences logic further allows a user to modify the plurality of preferences.

6. The device in claim 5, wherein the preferences logic allows a user to select a priority rating based on the type of the program and an available bandwidth.

7. The device in claim 6, wherein the program type is one of voice, email, short message service, global positioning system, data, video, and game.

8. The device in claim 6, wherein the available bandwidth is divided into a plurality of ranges.

9. The device in claim 1, wherein the network priority is further based on a security level of the variable bandwidth.

10. A wireless communications system for dynamically adapting network policy comprising:
    a wireless communications device including a network policy;
    a wireless transceiver in communication with the wireless communications device;
    a network in communication with the wireless transceiver;
    a server in communication with the network; and
    a database of preferences updated by the server;
    wherein the wireless communications device updates the database with the network policy through the server, and the server sends the wireless communications device the network policy upon an event, and
    wherein the event is one of a purchase of a new wireless communications device, a determination of a corrupt network policy, and a command to revert to an old network policy.

11. The system in claim 10, wherein the wireless communications device is a cellular telephone.

12. The system in claim 10, wherein the wireless transceiver is a cellular antenna tower.

13. The system in claim 10, wherein the network is a cellular communications network.

14. The system in claim 10, wherein the database of preferences comprises a plurality of preferences from a plurality of wireless communications devices.

15. The system in claim 10, wherein the network policy comprises a plurality of queues.

16. The system in claim 15, wherein the plurality of queues are associated with a priority.

17. The system in claim 16, wherein queues with a higher priority receive a larger portion of a bandwidth from the network than queues with a lower priority.

18. A method of establishing and administering a network policy on a wireless communications device in response to an event, the method comprising:

creating a network policy comprising a plurality of queues;

storing the network policy on a memory of the wireless communications device;

and allocating a portion of bandwidth based on the plurality of queues;

wherein each queue represents a priority level where queues with a higher priority receive larger portions of bandwidth than queues with a lower priority, and wherein the event is one of a purchase of a new wireless communications device, a determination of a corrupt network policy, and a command to revert to an old network policy.

19. The method in claim 18, further comprising editing the network policy.

20. The method in claim 18, further comprising updating a remote database with the network policy.

21. The method in claim 18, further comprising downloading the network policy from the remote database.

22. The method in claim 18, wherein the storing comprises storing the network policy on a memory on the wireless communications device.

23. The method in claim 18, wherein the plurality of queues are associated with a priority.

24. The method in claim 23, wherein queues with a higher priority receive a larger portion of a bandwidth than queues with a lower priority.

* * * * *